United States Patent [19]

Sellers

[11] Patent Number: 5,415,825
[45] Date of Patent: May 16, 1995

[54] BRANCHED HOSE CONSTRUCTION, HOSE UNIT THEREFOR AND METHODS OF MAKING THE SAME

[75] Inventor: Randall E. Sellers, Chandler, N.C.

[73] Assignee: Dayco Products, Inc., Dayton, Ohio

[21] Appl. No.: 146,259

[22] Filed: Nov. 2, 1993

[51] Int. Cl.[6] .................. B32B 31/06; F16L 13/00
[52] U.S. Cl. ........................ 264/262; 29/453;
   285/319; 285/150; 285/284; 285/331; 285/175
[58] Field of Search .............. 285/319, 150, 156, 155,
   285/921, 331, 289, 175; 264/262, 267, 275;
   29/890.14, 453, 527.1

[56] References Cited

U.S. PATENT DOCUMENTS

| | | | |
|---|---|---|---|
| 3,458,619 | 7/1969 | Prochaska | 264/262 X |
| 4,484,770 | 11/1984 | Sloane | 285/156 X |
| 4,648,628 | 3/1987 | Meadows et al. | 285/24 |
| 4,712,810 | 12/1987 | Pozzi | 285/150 X |
| 4,753,458 | 6/1988 | Case et al. | 285/93 |
| 4,856,823 | 8/1989 | Heren | 285/81 |
| 4,997,213 | 3/1991 | Traner et al. | 285/155 |
| 5,002,315 | 3/1991 | Bartholomew | 285/93 |
| 5,248,171 | 9/1993 | Briet | 255/156 |

FOREIGN PATENT DOCUMENTS

| | | | |
|---|---|---|---|
| 719613 | 10/1965 | Canada | 285/331 |
| 275749 | 7/1988 | European Pat. Off. | 285/175 |
| 360634 | 3/1990 | European Pat. Off. | 285/921 |
| 2157386 | 10/1985 | United Kingdom | 285/156 |

OTHER PUBLICATIONS

Manufacturing Processess by Roberts & Lapidge pp. 408–411, 1977 on plastic molding processess.

*Primary Examiner*—Randolph A. Reese
*Assistant Examiner*—Heather Chun Shackelford
*Attorney, Agent, or Firm*—Joseph V. Tassone

[57] ABSTRACT

A branched hose construction, hose unit therefor and methods of making the same are provided, the branched hose construction comprising a first tubular hose unit having opposite ends and having a tubular branch extending outwardly therefrom intermediate the opposite ends and having a free end, a second tubular hose unit having a free end telescoped with the free end of the tubular branch, and fastening structure interconnecting the telescoped free ends together, the fastening structure comprising a quick connect/disconnect structure, the second tubular hose unit comprising an end of a flexible hose and part of the quick connect/disconnect structure molded onto the end of the flexible hose and extending outwardly therefrom.

5 Claims, 2 Drawing Sheets

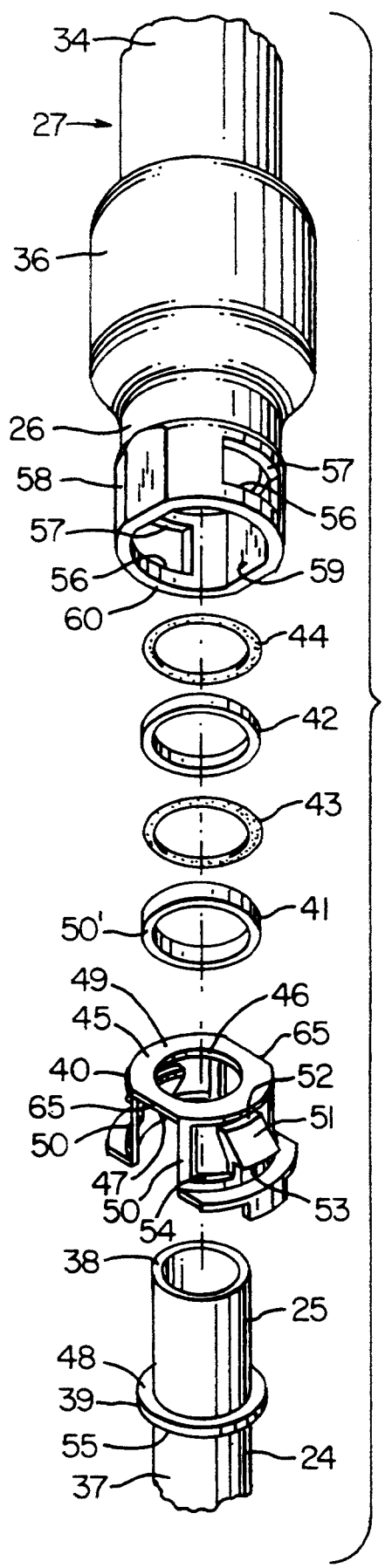
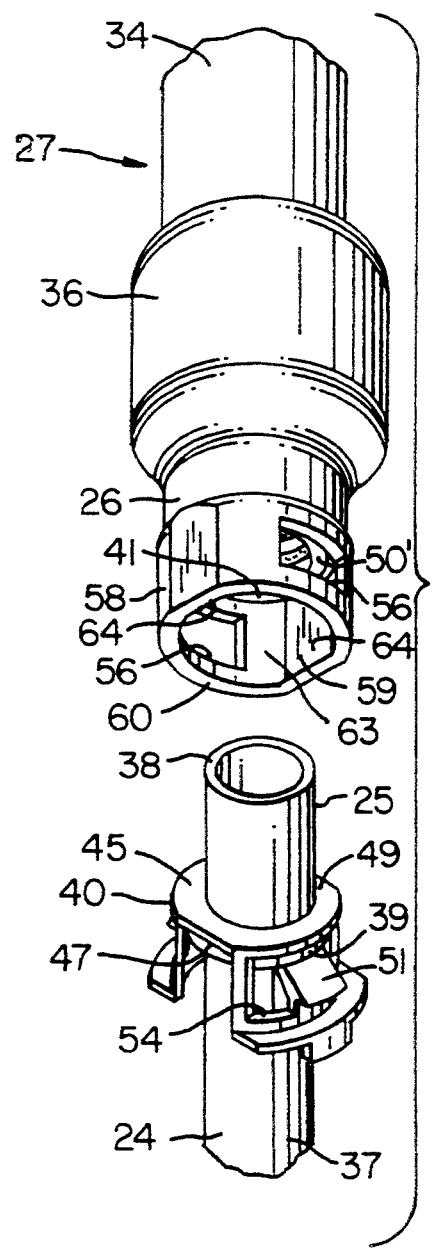

BRANCHED HOSE CONSTRUCTION, HOSE UNIT THEREFOR AND METHODS OF MAKING THE SAME

BACKGROUND OF THE INVENTION

1. Field of the Invention

This invention relates to a new branched hose construction and to a new hose unit therefor as well as to a new method of making such a new branched hose construction and to a new method of making such a new hose unit.

2. Prior Art Statement

It is known to provide a branched hose construction comprising a first tubular hose unit having opposite ends and having a tubular branch extending outwardly therefrom intermediate the opposite ends and having a free end means, a second tubular hose unit having a free end means telescoped with the free end means of the tubular branch, and fastening means interconnecting the telescoped free end means together. For example, see the U.S. patent to Meadows et al, No. 4,648,628.

Also see the U.S. patent to Traner et al, No. 4,997,213 for another branched hose arrangement.

Also see the U.S. patent to Bartholomew, No. 5,002,315; the U.S. patent to Case et al, No. 4,753,458 and the U.S. patent to Heren, No. 4,856,823 for quick connect/disconnect structure for interconnecting together a pair of fluid conduits.

SUMMARY OF THE INVENTION

It is one of the features of this invention to provide a branched hose construction wherein the fastening means between the two hose units that interconnect the telescoped parts of the two hose units together tends to prevent fluid leakage therebetween while at the same time providing a quick connect/disconnect arrangement.

In particular, it was found according to the teachings of this invention that when a separate clamp is utilized to fasten the telescoped parts of the branched hose construction as in the prior known arrangement, there is a tendency for the interconnection to leak because of improper tightening of the clamp.

However, it was found according to the teachings of this invention that by forming part of the end means of one of the hose units that telescopes onto the tubular branch of the other hose unit as part of a quick connect-/disconnect means, a more positive sealing is provided between the two hose units so as to tend to prevent leakage therebetween.

For example, one embodiment of this invention comprises a branched hose construction comprising a first tubular hose unit having opposite ends and having a tubular branch extending outwardly therefrom intermediate the opposite ends and having a free end means, a second tubular hose unit having a free end means telescoped with the free end means of the tubular branch, and fastening means interconnecting the telescoped free end means together, the fastening means comprising a quick connect/disconnect means and the second tubular hose unit comprising an end of a flexible hose and a part of the quick connect/disconnect means molded onto the end of the flexible hose and extending outwardly therefrom.

Accordingly, it is an object of this invention to provide a new branched hose construction having one or more of the novel features of this invention as set forth above or hereinafter shown or described.

Another object of this invention is to provide a new method of making such a branched hose construction, the method of this invention having one or more of the novel features of this invention as set forth above or hereinafter shown or de scribed.

Another object of this invention is to provide a new hose unit for a branched hose construction, the hose unit of this invention having one or more of the novel features of this invention as set forth above or hereinafter shown or described.

Another object of this invention is to provide a new method of making such a hose unit, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 3 is an exploded perspective view of the various parts of the branched hose construction illustrated in FIG. 2.

FIG. 4 is a view similar to FIG. 3 and illustrates one method of assembling the hose units of the branched hose construction of FIGS. 1 and 2 together.

DESCRIPTION OF THE PREFERRED EMBODIMENT

Figure 1:
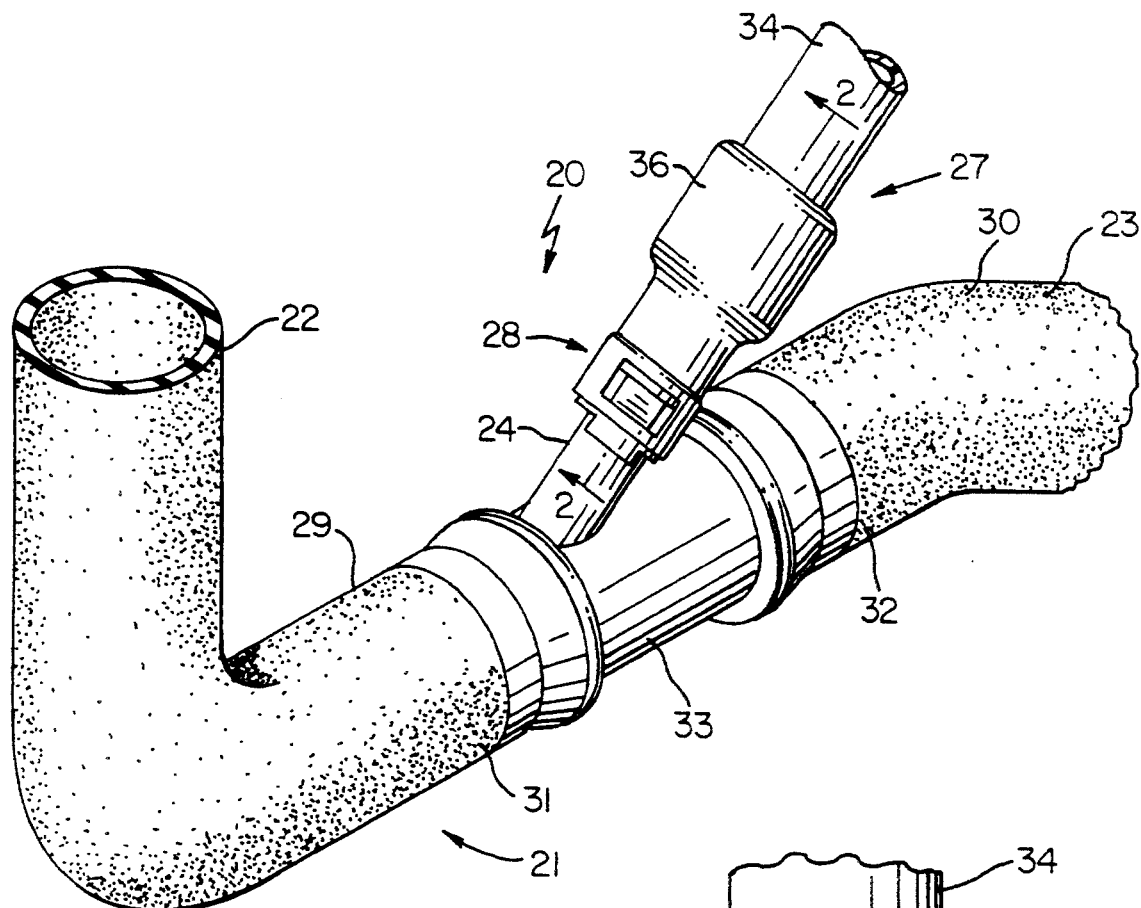
FIG. 1 is a fragmentary perspective view illustrating the new branched hose construction of this invention.

While the various features of this invention are hereinafter illustrated and described as being particularly adapted to provide a branched hose construction for use as a radiator and heater hose arrangement for a transportation vehicle or the like, it is to be understood that the various features of this invention can be utilized singly or in various combinations thereof to provide a branched hose construction for other apparatus as desired.

Therefore, this invention is not to be limited to only the embodiment illustrated in the drawings, because the drawings are merely utilized to illustrate one of the wide variety of uses of this invention.

Figure 2:
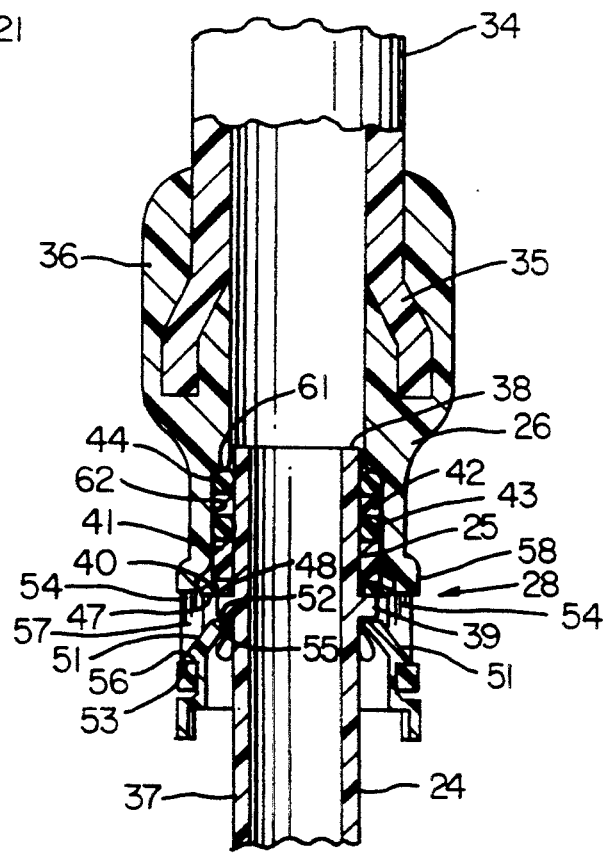
FIG. 2 is an enlarged fragmentary cross-sectional view taken on line 2—2 of FIG. 1.

Referring now to FIGS. 1 and 2, the new branched hose construction of this invention is generally indicated by the reference numeral 20 and comprises a first tubular hose unit generally indicated by the reference numeral 21 and having opposite ends 22 and 23 and a tubular branch 24 extending outwardly therefrom intermediate the opposite ends 22 and 23 and having a free end means 25 telescoped with a free end means 26 of a second tubular hose unit that is generally indicated by the reference numeral 27.

The telescoped free end means 25 and 26 of the tubular hose units 21 and 27 are fastened together in a unique manner according to the teachings of this invention that comprises a fastening means that is generally indicated by the reference numeral 28 and will be hereinafter described.

The use of a branched hose arrangement as a radiator and heater hose arrangement for an internal combustion engine of a transportation vehicle or the like is well known in the art. For example, see the aforementioned U.S. patent to Meadows et al, No. 4,648,628 and the aforementioned U.S. patent to Traner et al, No. 4,997,213 whereby these two U.S. patents are being incorporated into this disclosure by this reference thereto.

The first hose unit 21 comprises a pair of flexible hoses 29 and 30 respectively having adjacent ends 31 and 32 fluidly interconnected together by a T-connector 33 that carries the tubular branch 24 all in a manner fully set forth in the aforementioned U.S. patent to Meadows et al, No. 4,648,628 and need not be further described.

The second hose unit 27 comprises a flexible hose 34 having a free end 35 to which a part 36 of the fastening means 28 is molded to define the free end means 26 of the hose unit 27 that is telescoped with the free end means 25 of the tubular branch 24 of the first hose unit 21.

While the hoses 29, 30 and 34 can be formed of any suitable material, one embodiment thereof can comprise mainly rubber material, such as EPDM, that is cured into the desired configuration as illustrated in FIG. 1 and as fully disclosed in the aforementioned U.S. patent to Meadows et al, No. 4,648,628.

However, it is believed according to the teachings of this invention that the part 36 of the fastening means 28 can comprise plastic material, such as glass-filled nylon that is compression molded onto the end 25 of the hose 34 with a shuttle type injection press so that a sealing effect will be provided between the free end 35 of the hose 34 and the molded part 36 due to the plastic material of the part 36 shrinking during the molding operation as is well known in the art.

In the embodiment illustrated in the drawings, the free end 35 of the hose 34 is preformed with a bugle shape so as to provide a mechanical interlock of the end 35 with the molded part 36 in addition to the mold bonded arrangement thereof, such bugle shape of the end 35 being preformed and cured in the configuration illustrated in the drawings. Thereafter, such free end 35 can be trimmed to length and placed onto an arbor or a mold core when the part 36 is subsequently molded thereon as previously described.

The branch 24 of the first hose unit 21 is substantially cylindrical throughout the length thereof and thereby defines a substantially cylindrical external peripheral surface 37 that extends to the end 38 thereof except for an outwardly extending annular flange 39 that is disposed inboard of the end 38 as illustrated in the drawings for a purpose hereinafter set forth.

The fastening means 28 for the branched hose construction 20 of this invention is of the quick connect-/disconnect type and is generally similar to the quick connect/disconnect arrangements set forth in the aforementioned U.S. patent to Bartholomew, No. 5,002,315; the U.S. patent to Case et al, No. 4,753,458 and the U.S. patent to Heren, No. 4,856,823 whereby these three U.S. patents are also being incorporated into this disclosure by this reference thereto.

The fastening means 28 comprises a retainer 40, annular spacers 41 and 42 and O-ring sealing members 43 and 44, the retainer 40 and the spacers 41 and 42 being formed of any suitable material, such as plastic material molded into the configurations illustrated in the drawings, and the O-ring sealing members 43 being formed of conventional sealing material as is well known in the art.

The retainer 40 has a flat disc-like section 45 provided with a cylindrical opening 46 passing centrally therethrough and being adapted to be telescoped onto the free end means 25 of the tubular branch 24 in the manner illustrated in the drawings and have a side 47 thereof abut against a side 48 of the annular flange 39 for a purpose hereinafter described while another side 49 thereof is adapted to abut against a side 50' of the spacer 41 as illustrated in FIG. 2.

A pair of depending like flanges 50 extend from the side 47 of the section 45 of the retainer 40 and have a pair of flexible tangs 51 provided with edges 52 and 53, the tangs 51 being respectively aligned with large openings 54 formed through the respective flanges 50 as illustrated whereby the edges 52 of the tangs 51 are adapted to abut against a side 55 of the flange 39 of the tubular branch 24 as illustrated in FIG. 2 while the edges 53 are adapted to abut against edges 56 defined by rectangularly shaped openings 57 formed through a tubular part 58 of the molded part 36 of the hose unit 27 as illustrated in FIG. 2.

However, the edges 53 of the retainer 40 are adapted to be moved radially inwardly to clear the edges 56 of the part 36 by pressing inwardly on respective tabs 51 of the flanges 50 of the retainer 40 to effectively disconnect the retainer 40 from the openings 57 in the part 36 so that the retainer 40 together with the branched hose 24 can be uncoupled therefrom in the manner illustrated in FIG. 4.

The part 36 of the hose unit 27 is so molded that the same has an opening 59 passing through a free end 60 thereof and defining an annular shoulder 61 within the part 36 against which the O-ring 44 is adapted to abut in the sealing manner illustrated in FIG. 2 while the other O-ring 43, in a manner similar to the O-ring 44, sealingly engages against an internal peripheral surface means 62 of the part 36 to not only seal thereagainst but also to respectively seal against the external peripheral surface means 37 of the tubular branch 24 as illustrated in FIG. 2 when the tubular branch 24 is telescoped with the end 26 of the hose unit 27 as illustrated.

However, the opening 59 in the end 60 of the part 36 has a section 63 which is provided with a pair of flat surfaces 64 that align with straight opposed edge means 65 formed on the section 45 of the retainer 40 so as to orient the retainer 40 with the part 36 when the retainer 40 is inserted therein whereby the tangs 51 will be oriented with the openings 57 of the part 36 all in the manner illustrated in the drawings.

In this manner, the retainer 40 can be assembled on the end 25 of the tubular branch 24 so that the edges 52 of the retainer 40 snap over the flange 39 to engage against the surface 55 thereof as illustrated in FIG. 4 so that the retainer 40 is carried by the branch 24.

The O-rings 43 and 44 and spacers 41 and 42 are disposed within the part 36 of the hose unit 27 in stacked relation against the shoulder 61 thereof and are held therein by friction so that when the end 25 of the branch 24 is telescopically received in the opening 59 of the part 36, the edges 53 of the retainer 40 will eventually snap through the openings 57 and engage against the edges 56 of the part 36 in the manner illustrated in FIG. 2 to fully fasten the free end means 25 and 26 in their telescoped arrangement while at the same time utilizing the O-rings 43 and 44 to provide a fluid seal therebetween so as to prevent fluid leakage from the interconnection between the hose unit 27 and the tubular branch 24 as illustrated in FIG. 2 whereby it can be seen that the fastening means 28 of this invention provide a quick connect arrangement between the hose unit 27 and the tubular branch 24.

Likewise, the fastening means 28 provides a quick disconnect between the hose unit 27 and the tubular branch 24 by a person pushing radially inwardly on the tabs 51 of the retainer 40 so as to cause the edges 53 of the tangs 51 to clear the edges 56 of the molded part 36 and the tubular part 24 together with its assembled retainer 40 can than be pulled out of the part 36 of the hose unit 27.

Of course, if it is desired, the retainer 40 initially can be preassembled with the part 36 of the hose assembly 27 and then the tubular branch 24 can be inserted within the part 36 to couple with the retainer. 40 in the manner illustrated in FIG. 2, such alternate arrangement being fully disclosed in the aforementioned U.S. patent to Bartholomew, No. 5,002,315.

Therefore, it can be seen that it is a relatively simple method of this invention to form the fastening means 28 with a part 36 thereof being molded on the end 35 of the hose 34 to form part of the hose unit 27 while the remainder of the parts for the fastening means 28 cooperate with the part 36 to form a quick connect/disconnect means for interconnecting the hose units 21 and 27 together in the manner previously set forth.

Accordingly, it can be seen that this invention not only provides a new branched hose construction and a new method of making the same, but also this invention provides a new hose unit and a new method of making such a new hose unit.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a branched hose construction comprising a first tubular hose unit having opposite ends and having a tubular branch extending outwardly therefrom intermediate said opposite ends and having a free end means, a second tubular hose unit having a free end means telescoped over said free end means of said tubular branch, and fastening means interconnecting said telescoped free end means together, the improvement comprising the step of forming said fastening means to comprise a quick connect/disconnect means, and forming said second tubular hose unit to comprise and end of a flexible hose having inner and outer peripheral surfaces having a first portion thereof molded onto said inner and outer peripheral surfaces of said end of said flexible hose and having a second portion including a part of the quick connect/disconnect means extending axially outwardly therefrom, and also forming said free end of said flexible hose with an expansion that mechanically interconnects with said fist portion when said first portion is molded thereon.

2. A method as set forth in claim 1 and comprising the step of forming said part of said quick connect/disconnect means to be generally tubular and telescope over said free end means of said tubular branch.

3. A method as set forth in claim 2 and comprising the step of forming said flexible hose mainly of rubber material and said part of said quick connect/disconnect means mainly of plastic material.

4. A method as set forth in claim 3 and comprising the step of compression molding said first portion onto said end of said flexible hose and against said inner and outer peripheral surfaces thereof.

5. A method as set forth in claim 1 and comprising the step of forming said second portion to comprise the only means thereof that provides the quick connect/disconnect function with said first tubular hose unit.

* * * * *